US007124709B1

(12) United States Patent
Greer

(10) Patent No.: US 7,124,709 B1
(45) Date of Patent: Oct. 24, 2006

(54) PET FEEDING DEVICE

(76) Inventor: Robert W. Greer, 2411 Grubb Rd., Wilmington, DE (US) 19810

( * ) Notice: Subject to any disclaimer, the term of this patent is extended or adjusted under 35 U.S.C. 154(b) by 0 days.

(21) Appl. No.: 11/232,804

(22) Filed: Sep. 22, 2005

(51) Int. Cl.
*A01K 5/01* (2006.01)
(52) U.S. Cl. .................... 119/61.5; 119/61.57
(58) Field of Classification Search .......... 119/61.5, 119/61.54, 61.53, 61.1, 62, 61.3, 61.57
See application file for complete search history.

(56) References Cited

U.S. PATENT DOCUMENTS

| | | | | |
|---|---|---|---|---|
| 2,555,396 A * | 6/1951 | Cosner | ........................ | 119/51.5 |
| 2,659,345 A * | 11/1953 | Herbert | ........................ | 119/28.5 |
| 2,845,896 A * | 8/1958 | Copeland | .................. | 119/51.01 |
| 3,121,419 A * | 2/1964 | Gillespie | ..................... | 119/62 |
| 3,176,656 A * | 4/1965 | Bates | ........................... | 119/62 |
| 3,441,003 A * | 4/1969 | Lister et al. | ............... | 119/61.53 |
| 3,651,787 A * | 3/1972 | Cooper | ..................... | 119/51.01 |
| 3,776,193 A * | 12/1973 | Post, Sr. | ..................... | 119/51.5 |
| 4,044,723 A * | 8/1977 | Fitzpatrick | ................. | 119/61.5 |
| 4,175,516 A * | 11/1979 | Savage | ......................... | 119/62 |
| 4,440,111 A * | 4/1984 | Meyer | ...................... | 119/61.54 |
| 4,699,089 A * | 10/1987 | Teschke | ..................... | 119/51.5 |
| 4,793,290 A * | 12/1988 | O'Donnell | .................. | 119/62 |
| 4,798,170 A * | 1/1989 | DePiazzy | ................ | 119/61.57 |
| 5,144,912 A * | 9/1992 | Hammett et al. | ........ | 119/61.57 |
| D335,007 S * | 4/1993 | McPhee | ..................... | D30/133 |
| 5,600,910 A * | 2/1997 | Blackburn | ................... | 40/605 |
| D385,068 S * | 10/1997 | Malcolm | ................... | D30/130 |
| 5,706,597 A * | 1/1998 | Brandstetter | ............. | 40/611.13 |
| 5,794,565 A * | 8/1998 | Beshah | ..................... | 119/61.54 |
| 5,979,361 A * | 11/1999 | Willinger | ................. | 119/61.54 |
| 6,209,487 B1* | 4/2001 | Quinlan et al. | .......... | 119/51.01 |
| 6,478,277 B1* | 11/2002 | Winquest | ............... | 248/346.01 |
| 6,516,747 B1* | 2/2003 | Willinger | ................. | 119/61.54 |
| D506,295 S * | 6/2005 | Hammer et al. | ........... | D30/133 |
| 6,928,955 B1* | 8/2005 | Rokos | ........................ | 119/61.5 |
| 6,951,187 B1* | 10/2005 | McKoy | ..................... | 119/51.5 |

* cited by examiner

*Primary Examiner*—Yvonne R. Abbott
(74) *Attorney, Agent, or Firm*—Donald W. Huntley

(57) ABSTRACT

A pet feeder having a base with a removable back splash and side walls adapted to abut an interior wall with a baseboard.

8 Claims, 5 Drawing Sheets

PET FEEDING DEVICE

BACKGROUND OF THE INVENTION

A wide variety of animal feeding devices has previously been proposed. Typically, the devices have aimed at stability, sanitation, accessibility to the animal and ease of cleaning. For instance, many devices have been developed for supporting food and/or water at an elevated position that is convenient for the animal. Other features often include the ability to mount the feeder to a wall. Still others focus on isolation of food to avoid infestation.

SUMMARY OF THE INVENTION

The present invention provides a feeding device having one or more feeding bowls at an elevated position. The device is particularly useful for indoor settings, providing a stable apparatus which can fit snugly against interior walls and protects such walls.

Specifically, the instant invention provides a pet feeder comprising:

a. a base having a front wall and two side walls, each side wall having a rear edge and a recess formed in the rear edge to accommodate a baseboard;

b. a feeding surface mounted on the base and having at least one aperture formed therein in a configuration suitable for a feeding bowl; and c. a back splash removeably mounted on a back edge of the feeding surface.

DETAILED DESCRIPTION OF THE INVENTION

Figure 1:
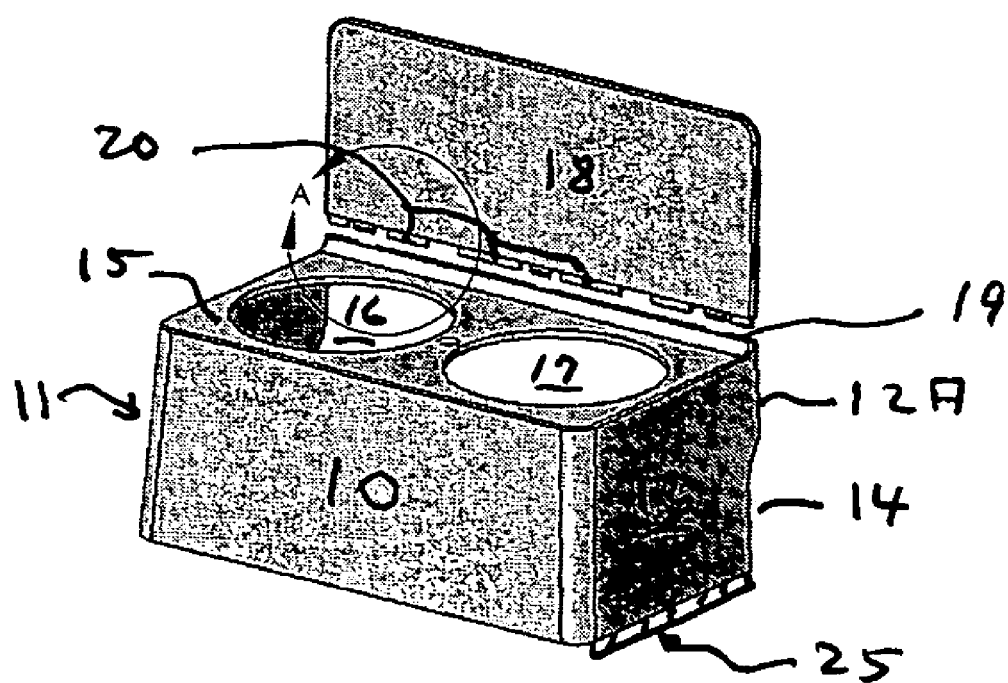
FIG. 1 is a front perspective view of an apparatus of the present invention, partly exploded.

The present invention will be more fully understood by reference to the drawings. In FIG. 1, a pet feeder is shown having a base having a front wall 10 and two side walls 11 and 12, each side wall having a rear edge 11A and 12A, respectively. Recesses 13 and 14 are formed in the rear edge of each side wall to accommodate a baseboard. Preferably the front and side walls are at an inward angle of about from 2 to 5 degrees, and especially about three degrees. This provides added stability and rigidity to the pet feeders.

Figure 3:
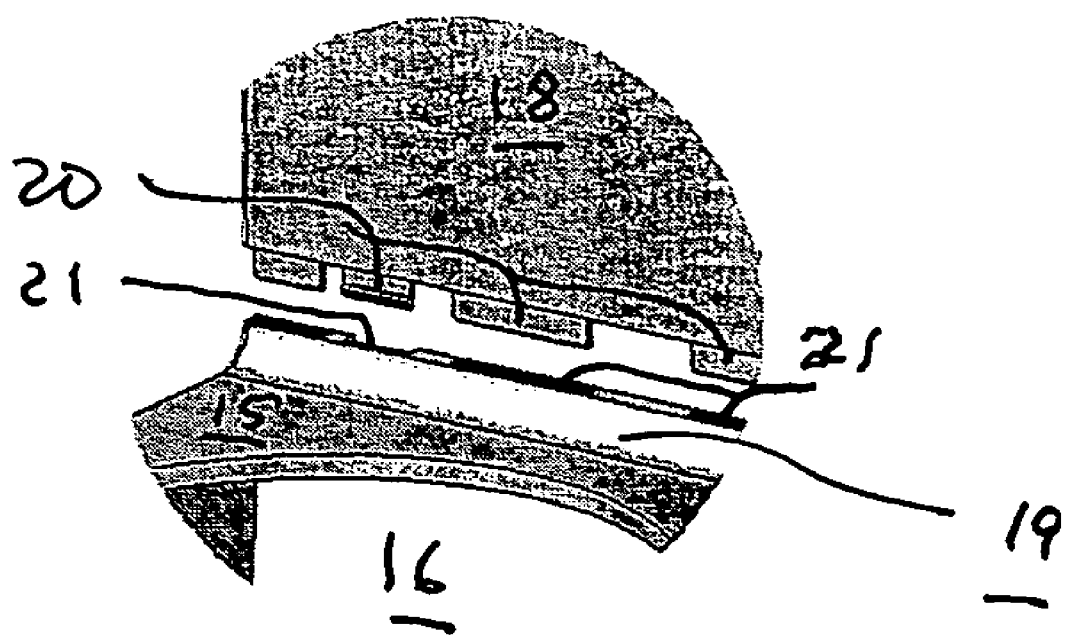
FIG. 3 is an enlarged view of an attachment means which can be used in the present invention.
Figure 4:
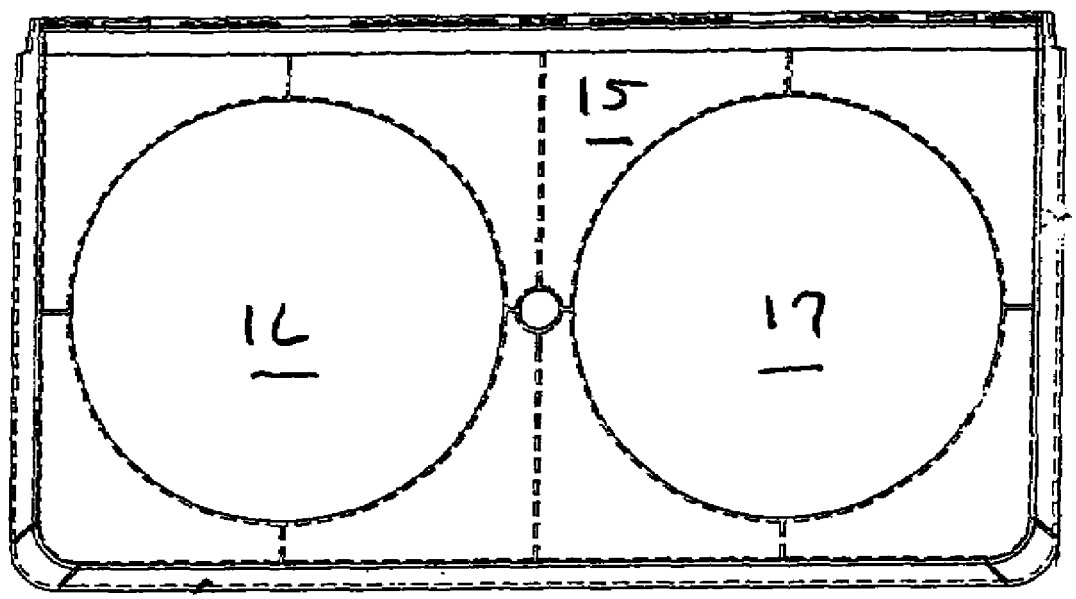
FIG. 4 is a top plan view of an apparatus of the present invention.

A feeding surface 15 is mounted on the base and has at least one aperture formed therein in a configuration suitable for a feeding bowl. In the embodiment shown, two apertures 16 and 17 are provided. Feeding bowls, not shown, can be positioned in each aperture. The rear edge 19, as more clearly shown in FIG. 3, is preferably upwardly curved for ease of cleaning.

A back splash 18 is removeably mounted to a back edge 19 of the feeding surface. As shown, the feeding device is partly exploded, in that the back splash is detached from the rear edge of the feeder. The back splash is preferably mounted on the feeding surface with a tongue-and-groove connection with at least one tongue 20 adapted to mate with at least one groove 21 in an interlocking connection. This is further illustrated in FIG. 3, which is an enlarged section of the interface between the feeding surface and the back splash identified by the "A" in a circle in FIG. 1. In this embodiment, several mating tongue-and-groove pairs are provided. Three sets of tongue-and-groove connections have been found to be particularly convenient. This facilitates both cleaning and moving of the feeding apparatus. The size of the back splash can very with the intended installation. The back splash should extend for the full width of the feeding surface, and preferably is about from 2 to 12 inches in height. A height of about 9 inches has been found to be particularly satisfactory.

The height of the feeding device is not critical, but the feeding surface is preferably about from 4 to 16 inches high, and especially about from 9 to 12 inches high.

A wide variety of materials can be used in the construction of the feeders of the present invention. Polymeric materials have been found to be particularly convenient and cost effective, including, for example, polyethylene, polypropylene, polystyrene and polycarbonate. Of these, polypropylene has been found to be particularly satisfactory, and is accordingly preferred. The polymeric material can be augmented with conventional additives, such as fillers, plasticizers, ultraviolet light stabilizers and reinforcing agents. Fibrous reinforcing agents, such as fiberglass, can be used n quantities typical of those used in the art.

Figure 2:
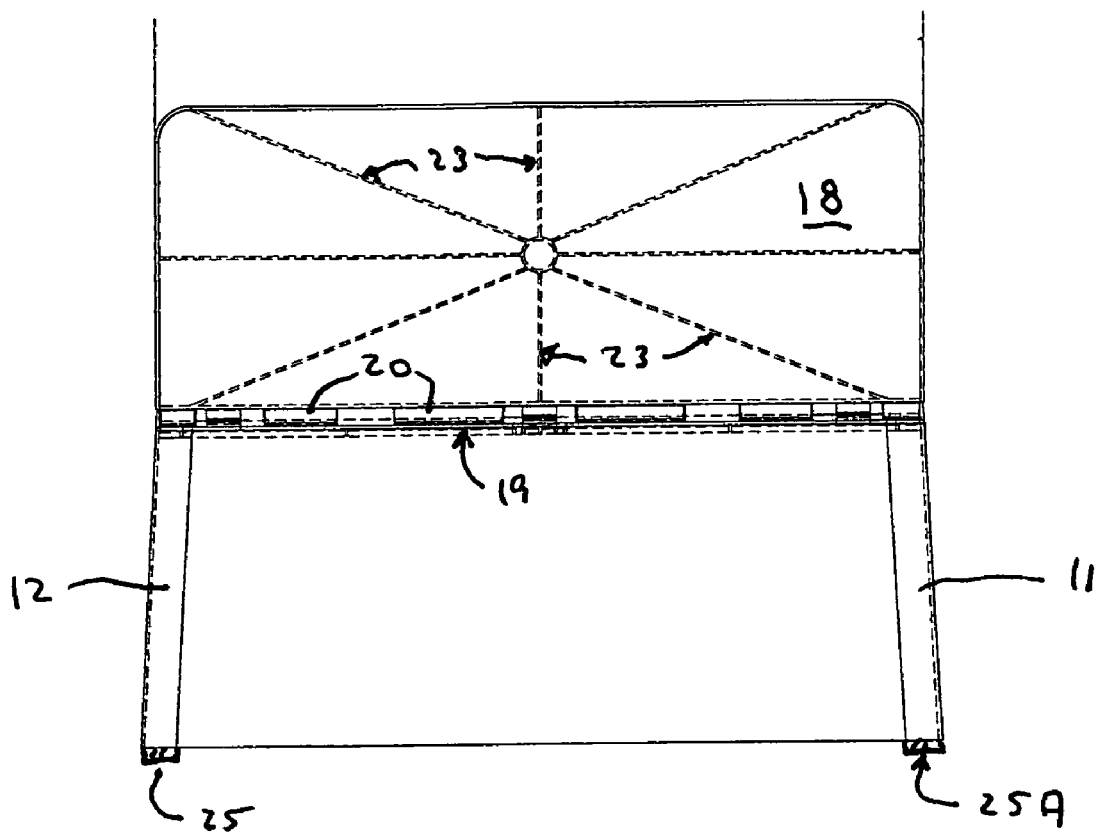
FIG. 2 is a rear view of an apparatus of the present invention.

The back splash in the feeders of the present invention preferably further comprises at least one reinforcing rib, shown in FIG. 2 as element 23.

Figure 5:
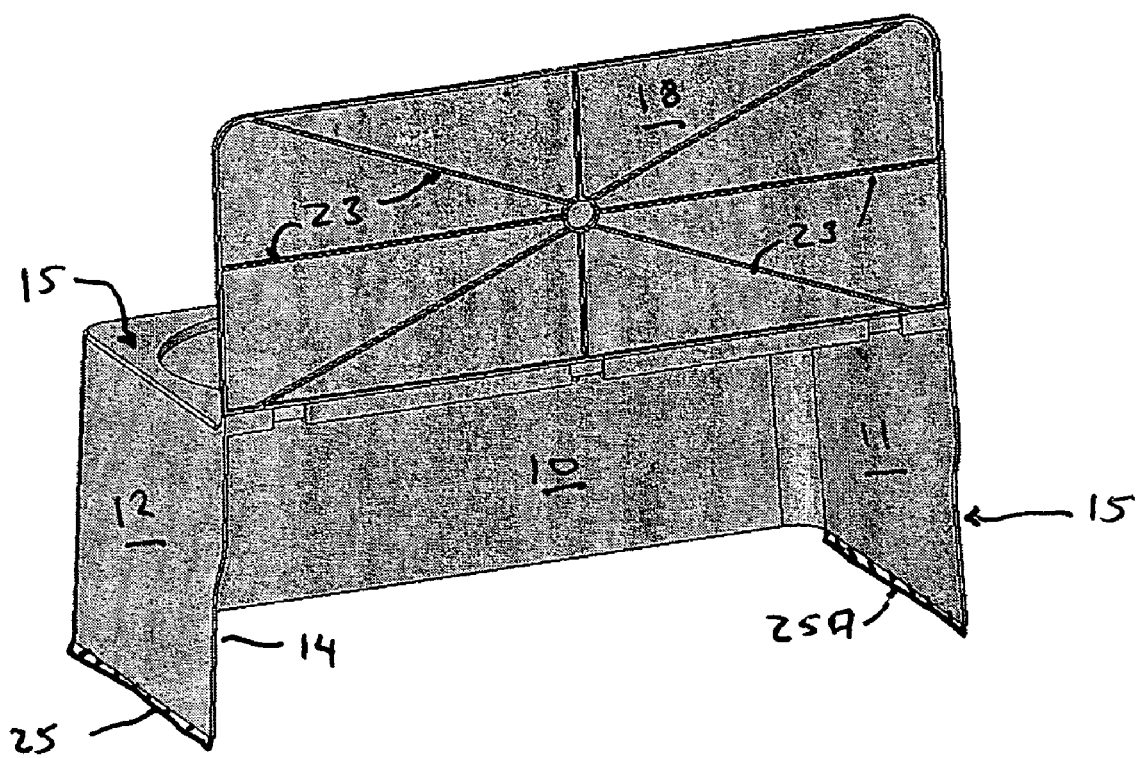
FIG. 5 is a rear perspective view of an apparatus of the present invention.

The pet feeders of the present invention preferably further comprise a non-skid surface on the bottom of the base. The specific material can vary widely, and is generally a foamed or unfoamed elastomer or polymer. This is illustrated in FIGS. 1, 2 and 5 as elements 25 and 25A.

The present invention is defined by the following claims. However, it will be appreciated by those skilled in the art that modifications can be made without departing from the inventive concept of the present invention.

I claim:

1. A pet feeder comprising:

a. a base having a front wall and two side walls, each side wall having a rear edge and a recess formed in the rear edge of each side wall to accommodate a baseboard;

b. a feeding surface mounted on the base and having at least one aperture formed therein in a configuration suitable for a feeding bowl; and c. a back splash removeably mounted on a back edge of the feeding surface.

2. A pet feeder of claim 1 wherein the feeding surface has at least two apertures.

3. A pet feeder of claim 1 wherein the backsplash is removeably mounted to the feeding surface with a tongue-and-groove connection with at least one tongue adapted to mate with at least one groove in an interlocking connection.

4. A pet feeder of claim 1 wherein the feeding surface is about from 4 to 16 inches high.

5. A pet feeder of claim 4 wherein the feeding surface is about from 9 to 12 inches high.

6. A pet feeder of claim 1 consisting essentially of polypropylene.

7. A pet feeder of claim 1 further comprising a non-skid surface on the bottom of the base.

8. A pet feeder of claim 1 wherein the back splash comprises at least one reinforcing rib.

* * * * *